United States Patent
Chiu

(10) Patent No.: US 7,644,805 B2
(45) Date of Patent: Jan. 12, 2010

(54) POWER GENERATION SYSTEM

(76) Inventor: Yu Chiu, 224 Wintermute Blvd., Toronto, Ontario (CA) M1W 3L5

( * ) Notice: Subject to any disclaimer, the term of this patent is extended or adjusted under 35 U.S.C. 154(b) by 608 days.

(21) Appl. No.: 11/323,847

(22) Filed: Jan. 3, 2006

(65) Prior Publication Data
US 2007/0152450 A1      Jul. 5, 2007

(51) Int. Cl.
*F03G 3/00* (2006.01)
(52) U.S. Cl. .............................. 185/33; 185/31; 185/32
(58) Field of Classification Search ............. 74/DIG. 9; 185/27, 31, 32, 33, 4, 6
See application file for complete search history.

(56) References Cited
U.S. PATENT DOCUMENTS

| | | | | |
|---|---|---|---|---|
| 3,194,008 A | * | 7/1965 | Baumgartner | 60/495 |
| 3,625,089 A | * | 12/1971 | Rutkove | 74/522 |
| 3,934,964 A | * | 1/1976 | Diamond | 415/7 |
| 3,958,130 A | * | 5/1976 | Van Mechelen | 290/54 |
| 4,220,003 A | * | 9/1980 | Doi | 60/325 |
| 4,589,259 A | * | 5/1986 | Boutto et al. | 60/698 |
| 5,579,259 A | * | 11/1996 | Samachisa et al. | 365/185.14 |

* cited by examiner

*Primary Examiner*—David M Fenstermacher
(74) *Attorney, Agent, or Firm*—David W. Wong

(57) ABSTRACT

An electrical generator is driven by gravitational force provided by a plurality of pairs of water tanks. Each pair of water tanks is suspended by an elongated chain supported by a series of pulleys. The water tanks in each pair of water tanks move between an upper position and a lower position alternately by filling selected ones of the water tanks with water and draining from the other selected ones of the water tanks. The vertical movement of the water tanks alternately filled with water is translated by ratchet wheels and bevel gear wheels to rotate the electrical generator in the same direction for generating the electrical power.

8 Claims, 3 Drawing Sheets

POWER GENERATION SYSTEM

BACKGROUND OF THE INVENTION

1. Field of the Invention

This invention relates to an alternative power generation system and more particularly relates to a mechanical system for converting gravitational force to electric power. The system utilizes pulleys driven by a variable weight provided by a renewable material such as water to create the gravitational force.

2. Background Art

Electrical power is presently mainly produced by either fossil fuel, nuclear energy, or hydro energy. Fossil fuel such as coal is a non-renewable material which is depleting in an ever alarming increasing rate that it will soon become unavailable. Also, the burning of fossil fuel in the production of electrical power also produces numerous harmful pollution to the natural environment. On the other hand, nuclear power generation poses potential wide spread natural disasters in case of system accident or failure such as a melt down. The harmful effect from such disasters may last for a long time. Furthermore, the disposal of the spent nuclear fuel substances has not been resolved with any satisfactory proven methods for ensuring that they would not cause any long term harmful effect. Hydro energy provides the cleanest source of producing electrical power; however, it can only be produced at favorable natural locations in which hydro dams may be erected. Alternative electrical power generation systems by wind energy and solar energy are costly to build and maintain and they must also be erected at suitable geographical locations in which such energy sources exist in an acceptable condition. Fuel cells for converting hydrogen gas to useful electrical energy is still in its infancy stage and it is still not practical for producing any reasonable amount of cost effective electrical power.

SUMMARY OF THE INVENTION

It is a principal object of the present invention to provide an alternative electrical power generation system which is not restricted by geographical conditions.

It is another object of the present invention to provide an electrical power generation system may be easily erected at any location.

It is another object of the present invention to provide an electrical power generation system which is easy to erect and maintain.

It is another object of the present invention to provide an electrical power generation system which does not pose any harmful effect to the natural environment.

BRIEF DESCRIPTION OF THE DRAWINGS

Other objects and advantages of the present invention will become apparent from the following detailed description of the preferred embodiments thereof in connection with the accompanying drawings in which.

DETAILED DESCRIPTION OF THE PREFERRED EMBODIMENTS

Figure 1:
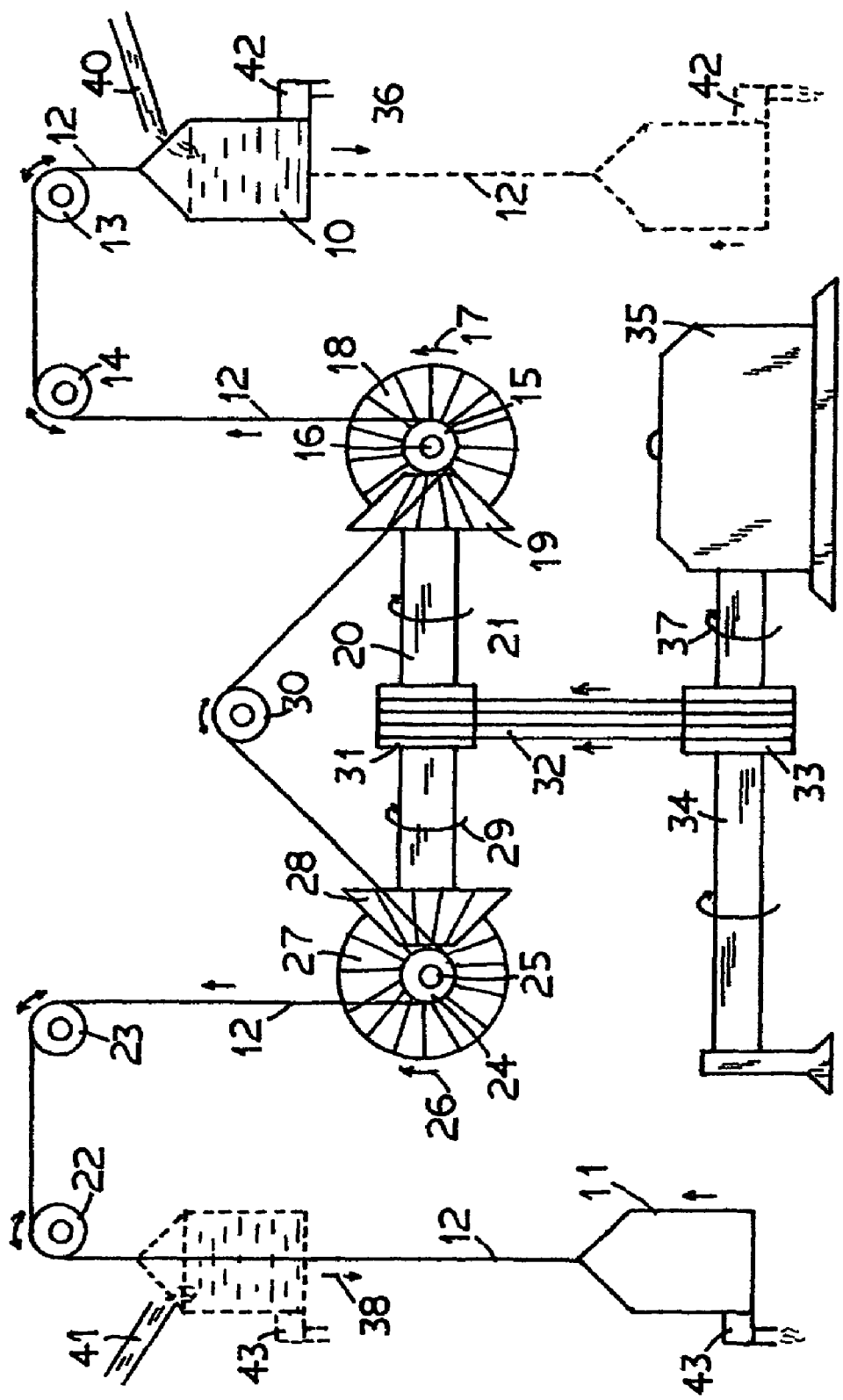
FIG. 1 is a schematic front perspective view of the basic power generation system according to the present invention.

With reference to the drawings in which like reference numerals designate corresponding parts in the difference views, the basic system according to the present invention. As shown in FIG. 1, two water tanks 10 and 11 are suspended by an elongated band such as a chain or cable 12 at its two ends. The portion of the cable 12 coupled to the water tank 10 is supported by two freely rotatable pulleys 13 and 14 and then engages with a ratchet wheel 15 mounted on a rotary shaft 16. The ratchet wheel 15 meshes with the rotary shaft 16 when it rotates in the direction as shown by the arrow 17 and it will automatically disengages with the rotary shaft 16 when it rotates in the opposite direction to become a freely rotatable pulley. A bevel gear 18 is mounted on the rotary shaft 16. The bevel gear 18 engages with a complementary bevel gear 19 mounted on a drive shaft 20 such that when the rotary shaft 16, and in turn the bevel gear 18, rotates in the direction 17, the complementary bevel gear 19 will turn the drive shaft 20 to rotate in the direction as shown by the arrow 21. Similarly, the portion of the cable 12 coupled to the water tank 11 is supported by two freely rotatable pulleys 22 and 23 and then engages with a ratchet wheel 24 mounted on a second rotary shaft 25. The ratchet wheel 24 meshes with the second rotary shaft 25 when it rotates in the direction as shown by the arrow 26 and it will automatically disengage with the rotary shaft 25 when it rotates in the opposite direction to become a freely rotatable pulley. A bevel gear 27 is mounted on the rotary shaft 25 which engages with a complementary bevel gear 28 mounted on the drive shaft 20 at the opposite end to the complementary bevel gear 19. The rotation of the complementary bevel gears 27 and 28 will cause the drive shaft 20 to rotate in the direction shown by the arrow 29 which is in the same direction as the arrow 21. A freely rotatable guide pulley 30 is provided to support the cable 12 at the mid point between the ratchet wheels 15 and 24. The position of the guide pulley 30 relative to the positions of the ratchet wheels 15 and 24 is adjustable so as to provide a desirable drive tension of the cable 12 engaging with the ratchet wheels 15 and 24. A drive wheel 31 is mounted on the drive shaft 20. A plurality of drive belts 32 couple the drive wheel 31 to a rotary wheel 32 mounted on the main shaft 34 linked to the electrical generator 35.

As shown in FIG. 1, when the water tank 10 is at the top position it will be filled with water, and the full weight of the filled water tank 10 will move downwards to pull the cable 12 by gravitational force as shown by the arrow 36. The downward movement of the water tanks 10 will cause the ratchet wheel 15 to drive the rotary shaft 16 to rotate in the direction 17, and in turn, the drive shaft 20 to rotate in the direction 21 so as to turn the electrical generator 35 in the direction 37 to generate the electrical power. When the water tank 10 reaches the bottom position, water in the tank will be drained therefrom; in the meantime the empty water tank 11 as shown in dotted line, suspended at the other end of the cable 12 will be located at the top position and it is being filled with water while water is being drained from the water tank 10. As soon as water has been drained from the water tank 10 and the water tank 11 has been filled with water, the full weight of the filled water tank 11 will move downwards by the gravitational force to pull the cable 12 to move downwards as shown by the arrow 38. The downward movement of the cable 12 will cause the ratchet wheel 24 to turn the rotary shaft 25 to rotate in the direction 27 such that drive shaft 20 will rotate in the direction 29 which is the same direction as 21. Therefore, the cable 12 will be alternately pulled by the gravitational forces provided by the filled water tanks 10 and 11 to rotate the electrical generator 35 in the same direction to generate the electrical power.

Water for the water tanks 10 and 11 may be provided by water pipes 40 and 41 with the water supplied from a storage water tower located at a high elevation by natural flow of the water from water tower or alternately the water may be pumped therefrom. The drained water released from the water tanks 10 and 11 by the opening of their remote-controlled drain valves 42 and 43 respectively may be conducted to a collection pool from which it is pumped back to the storage water tower.

Figure 2:
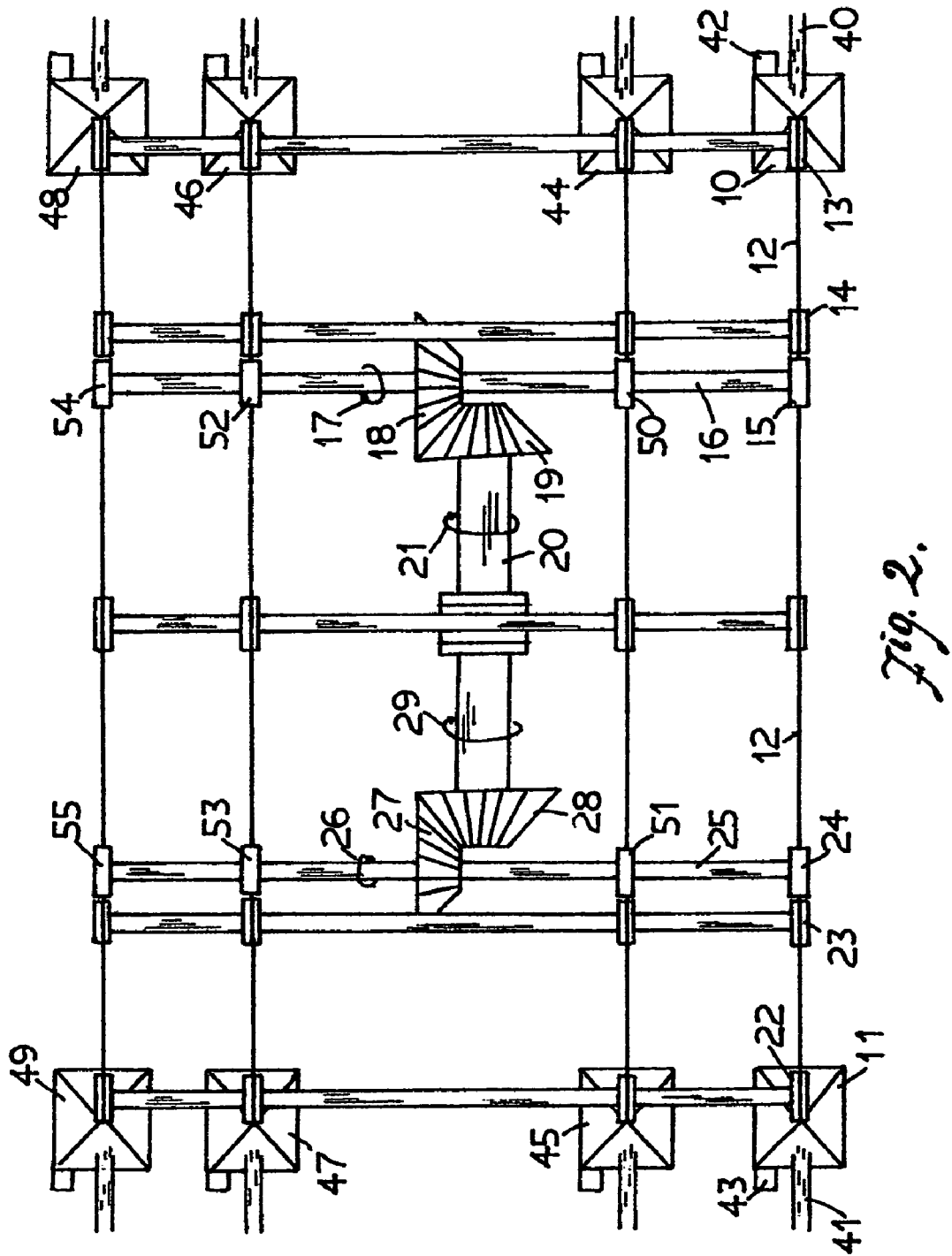
FIG. 2 is a schematic top view of the system having four water tanks to provide a driving force for the electrical generator.
Figure 3:
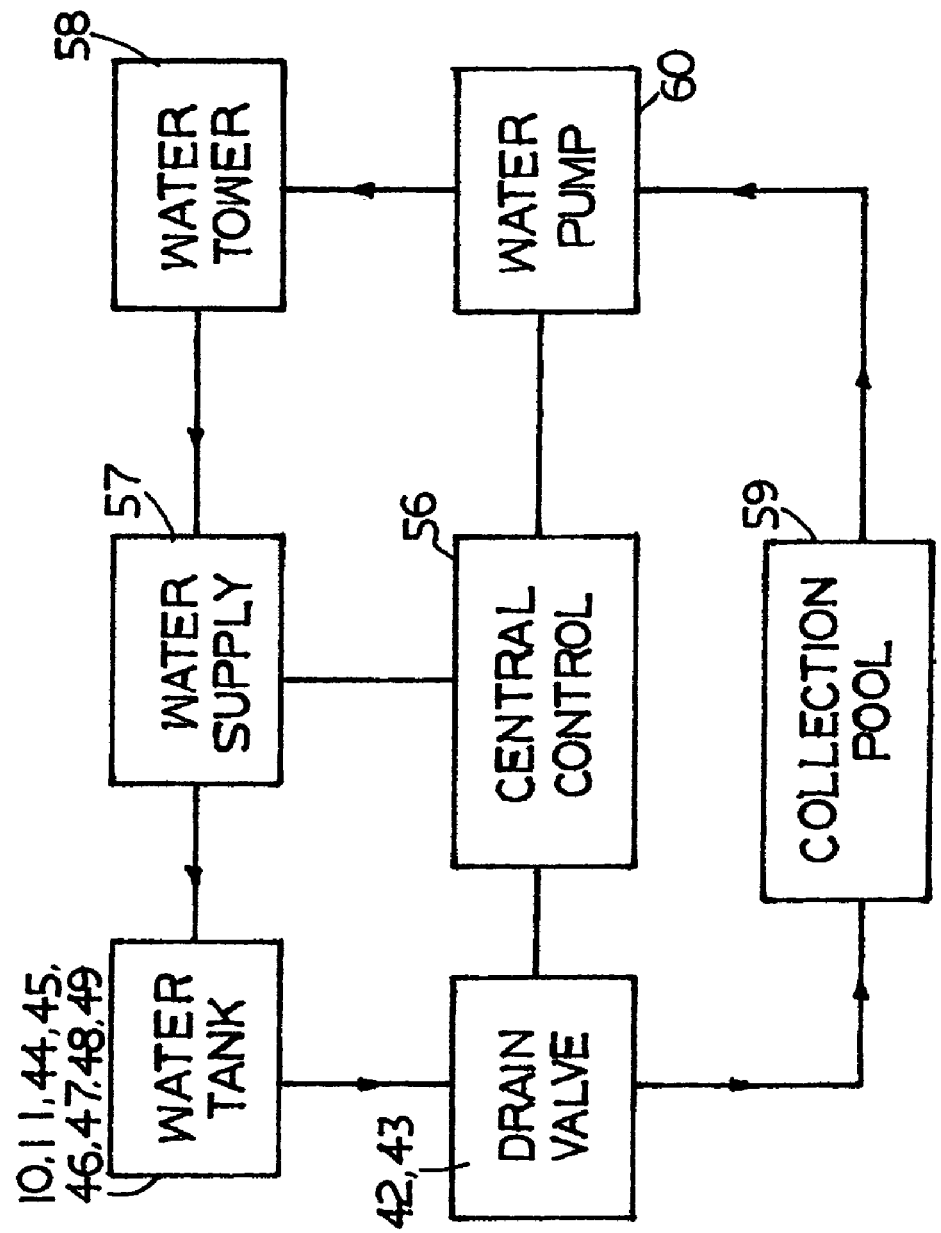
FIG. 3 is a schematic diagram showing the control for the operation of the system.

The rotary shafts 16 and 25 may be driven by a plurality of rows of pairs of water tanks. Four rows are shown in FIG. 2 as an exemplary embodiment. The second row has two water tanks 44 and 45, the third row has two water tanks 46 and 47, and the fourth row has two water tanks 48 and 49. The gravitational force provided by these water tanks will drive the rotary shafts 16 and 25 to rotate in the similar manner as described above by the respective ratchet wheels 50, 51, 52, 53, 54 and 55. The water tanks are filled and drained alternately at various evenly spaced time periods controlled by a control system as best shown in FIG. 3 consisting of a central control 56 which actuates a water supply device 57 to conduct or pump water from the storage water tower 58 through water pipes to fill the various water tanks at predetermined times such that the drive shaft 20 will rotate in the same direction by the gravitational downward movement of the water filled tanks. The central control 56 also actuates the drain valves of the various water tanks 10, 11, 44, 45, 46, 47, 48 and 49 by remote signal at various predetermined times for draining the water from the water tanks located at the lower position so that they will be pulled back by the chain to the upper position. The drain water is conducted to a collection pool 59 from which the water is re-cycled back to the storage water tower 58 by a water pump 60. In this manner, the drive shaft 20 is rotated by the gravitational force generated by the downward movement of the various water filled water tanks to drive the motor shaft 34 in the same direction for generating the electrical power.

The system of the present invention may be erected at any chosen site for supplying electrical power for the immediate surrounding area. It is simple in structure and easy to maintain and it does not pose any harmful effect to the natural environment. If the system is erected close to a river or lake, the water supply may be pumped to the storage water tower directly from the river or lake and the drained water from the water tanks may be released directly back to the river or lake.

While the preferred embodiments of the invention have been described above, it will be recognized and understood that various modifications may be made therein and the appended claims are intended to cover all such modifications which may fall within the spirit and scope of the invention.

What is claimed is:

1. A power generation system comprising:
a plurality of pairs of water tanks wherein each pair of said water tanks is suspended between two ends of an elongated band supported by a series of pulleys, said each pair of said water tanks being operative alternately to position between an upper position and a lower position,
a first ratchet wheel rotatable in a first direction and in contact engagement with a first portion of said elongated band, said first ratchet wheel being mounted on a first rotary shaft rotatable in said first direction,
a first bevel gear wheel mounted on said first rotary shaft,
a first complementary bevel gear wheel mounted on a drive shaft and in rotatable engagement with said first bevel gear wheel,
a second ratchet wheel rotatable in a second direction opposite to said first direction and in contact engagement with a second portion of said elongated band, said second ratchet wheel being mounted on a second rotary shaft rotatable in said second direction,
a second bevel gear wheel mounted on said second rotary shaft,
a second complementary bevel gear wheel mounted on said drive shaft and in rotatable engagement with said second bevel gear wheel and adapted to rotate said drive shaft in said first direction,
said drive shaft being rotatably coupled to a rotatable shaft of an electrical power generator through a drive belt.

2. A power generation system according to claim 1 wherein said elongated band is a cable.

3. A power generation system according to claim 2 including a plurality of water pipes located adjacent to said water tanks and operative for alternately filling each water tank in said each pair of water tanks with water when a selected one of said water tanks is located at said upper position.

4. A power generation system according to claim 3 including a remotely operative drain valve provided on each said water tanks, and being operative for releasing water from said water tanks when a selected one of said water tanks is located at said lower position.

5. A power generation system according to claim 4 including a central control operative for controlling water filling operation of said water tanks at various predetermined time whereby downward movement by gravitational force of selected ones of said water tanks filled with water causes said drive shaft to rotate said rotor shaft of said electrical generator to generate an electric power output.

6. A power generation system according to claim 5 wherein water released from said water tanks located at said lower position is conducted to a collection pool.

7. A power generation system according to claim 6 including a first water pump coupled to said water pipes and a storage water tower and operative by said central control for filling selected ones of said water tanks located at said upper position with water.

8. A power generation system according to claim 7 including a second water pump coupled to said collection pool and said storage water tower and operative for returning water from said collection pool to said storage water tower.

* * * * *